United States Patent
Liu et al.

(10) Patent No.: US 10,610,985 B2
(45) Date of Patent: *Apr. 7, 2020

(54) MULTILAYER BARRIER MATERIALS WITH PVD OR PLASMA COATING FOR VACUUM INSULATED STRUCTURE

(71) Applicant: WHIRLPOOL CORPORATION, Benton Harbor, MI (US)

(72) Inventors: Hua Liu, St. Joseph, MI (US); Laksha J. Deka, Mishawaka, IN (US); Mohamed Alshourbagy, Stevensville, MI (US); Diptesh Mukherjee, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 411 days.

This patent is subject to a terminal disclaimer.

(21) Appl. No.: 14/980,702

(22) Filed: Dec. 28, 2015

(65) Prior Publication Data
US 2017/0182607 A1 Jun. 29, 2017

(51) Int. Cl.
*F25D 23/06* (2006.01)
*B29C 51/14* (2006.01)
(Continued)

(52) U.S. Cl.
CPC .............. *B23P 15/26* (2013.01); *F16L 59/065* (2013.01); *F25D 23/062* (2013.01);
(Continued)

(58) Field of Classification Search
CPC .. F25D 23/063; F25D 23/064; F25D 2201/14; B29L 2031/7622; B29C 51/082; B29C 51/14
See application file for complete search history.

(56) References Cited

U.S. PATENT DOCUMENTS

| 948,541 A | 2/1910 | Coleman |
|---|---|---|
| 1,275,511 A | 8/1918 | Welch |

(Continued)

FOREIGN PATENT DOCUMENTS

| CA | 626838 A | 5/1961 |
|---|---|---|
| CA | 1320631 | 7/1993 |

(Continued)

OTHER PUBLICATIONS

International Search Report, Application No. PCT/US2017/021068, dated Nov. 2, 2017, 9 pages.

(Continued)

*Primary Examiner* — Christopher J Besler
(74) *Attorney, Agent, or Firm* — Price Heneveld LLP

(57) ABSTRACT

A method of forming a vacuum insulated structure includes providing a multi-layer sheet of material comprising at least one layer of barrier material that is disposed between first and second outer layers. The barrier material and the first and second outer layers comprise thermoplastic polymers. The multi-layer sheet of material is thermoformed to form a non-planar first component. The first component is at least partially coated utilizing a plasma polymerization process or a physical vapor deposition process to improve the barrier properties of the first component. The method further includes securing a second component to the first component to form an interior space therebetween. Porous filler material is positioned in the interior space, and a vacuum is formed in the interior space.

19 Claims, 6 Drawing Sheets

(51) Int. Cl.
*B29C 51/08* (2006.01)
*B29L 31/00* (2006.01)
*B23P 15/26* (2006.01)
*F16L 59/065* (2006.01)
*B29K 67/00* (2006.01)
*B29K 7/00* (2006.01)
*B29K 305/00* (2006.01)
*B29K 103/04* (2006.01)
*B29K 55/02* (2006.01)

(52) U.S. Cl.
CPC ............ *B29C 51/082* (2013.01); *B29C 51/14* (2013.01); *B29K 2055/02* (2013.01); *B29K 2067/006* (2013.01); *B29K 2103/04* (2013.01); *B29K 2305/00* (2013.01); *B29L 2031/7622* (2013.01); *F25D 2201/14* (2013.01)

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherbum |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schiff |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell et al. |
| 5,768,837 A | 6/1998 | Sjoholm |
| 5,792,801 A | 8/1998 | Tsuda et al. |
| 5,813,454 A | 9/1998 | Potter |
| 5,826,780 A | 10/1998 | Nesser et al. |
| 5,827,385 A | 10/1998 | Meyer et al. |
| 5,834,126 A | 11/1998 | Sheu |
| 5,843,353 A | 12/1998 | DeVos et al. |

(56) References Cited

U.S. PATENT DOCUMENTS

| | | |
|---|---|---|
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,970 B1 | 7/2001 | Nam et al. |
| 6,294,595 B1 | 9/2001 | Tyagi et al. |
| 6,305,768 B1 | 10/2001 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 7,993,723 B2 * | 8/2011 | Jung .................... F16L 59/065 312/406 |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,343,395 B2 | 1/2013 | Hu et al. |
| 8,353,177 B2 | 1/2013 | Adamski et al. |
| 8,382,219 B2 | 2/2013 | Hoffmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,491,070 B2 | 7/2013 | Davis et al. |
| 8,516,845 B2 | 8/2013 | Wuesthoff et al. |
| 8,522,563 B2 | 9/2013 | Allard et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,038,403 B2 | 5/2015 | Cur et al. |
| 9,056,952 B2 | 6/2015 | Eilbracht et al. |
| 9,071,907 B2 | 6/2015 | Kuehl et al. |
| 9,074,811 B2 | 7/2015 | Korkmaz |
| 9,080,808 B2 | 7/2015 | Choi et al. |

(56) References Cited

U.S. PATENT DOCUMENTS

| | | |
|---|---|---|
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 * | 9/2015 | Kuehl et al. |
| 9,140,481 B2 | 9/2015 | Curr et al. |
| 9,170,045 B2 | 10/2015 | Oh et al. |
| 9,170,046 B2 | 10/2015 | Jung et al. |
| 9,182,158 B2 | 11/2015 | Wu |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 10,018,406 B2 * | 7/2018 | Liu ................. F25D 23/062 |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0240612 A1 | 9/2012 | Wuesthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 * | 10/2013 | Wu ......................... B29C 51/02 264/101 |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0346942 A1 | 11/2014 | Kim et al. |
| 2014/0364527 A1 | 12/2014 | Matthias et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |

(56) References Cited

U.S. PATENT DOCUMENTS

| | | |
|---|---|---|
| 2015/0027628 A1 | 1/2015 | Cravens et al. |
| 2015/0059399 A1 | 3/2015 | Hwang et al. |
| 2015/0115790 A1 | 4/2015 | Ogg |
| 2015/0118435 A1* | 4/2015 | Kimura .............. B32B 37/18 428/69 |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 7/2004 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 5/2012 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 102008026528 A1 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0260699 | 3/1988 |
| EP | 0480451 | 4/1992 |
| EP | 0645576 A1 | 3/1995 |
| EP | 0601518 | 1/1996 |
| EP | 0860669 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1624263 A2 | 8/2006 |
| EP | 1484563 | 10/2008 |
| EP | 2342511 | 8/2012 |
| EP | 2543942 A2 | 1/2013 |
| EP | 2607073 A2 | 6/2013 |
| EP | 2789951 | 10/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | 03013779 | 1/1991 |
| JP | 104165197 | 6/1992 |
| JP | 04165197 | 10/1992 |
| JP | 04309778 A | 11/1992 |
| JP | 06159922 | 6/1994 |
| JP | 7001479 | 1/1995 |
| JP | H07167377 A | 7/1995 |
| JP | 08300052 | 11/1996 |
| JP | H08303686 A | 11/1996 |
| JP | H09166271 A | 6/1997 |
| JP | 10113983 | 5/1998 |
| JP | 11159693 A | 6/1999 |
| JP | 11311395 | 11/1999 |
| JP | 11336990 | 12/1999 |
| JP | 2000097390 | 4/2000 |
| JP | 2000117334 | 4/2000 |
| JP | 2000320958 A | 11/2000 |
| JP | 2001038188 | 2/2001 |
| JP | 2001336691 A | 12/2001 |
| JP | 2001343176 | 12/2001 |
| JP | 2002068853 | 3/2002 |
| JP | 3438948 | 8/2003 |
| JP | 03478771 | 12/2003 |
| JP | 2001116437 A | 4/2004 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 A | 9/2005 |
| JP | 2006077792 A | 3/2006 |
| JP | 2006161834 A | 6/2006 |
| JP | 2006161945 A | 6/2006 |
| JP | 03792801 | 7/2006 |
| JP | 2006200685 A | 8/2006 |
| JP | 2007263186 | 10/2007 |
| JP | 4111096 | 7/2008 |
| JP | 2008157431 A | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 A | 4/2010 |
| JP | 2010108199 | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 | 1/2011 |
| JP | 2011069612 A | 4/2011 |
| JP | 04779684 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2013195009 A | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |

(56) References Cited

FOREIGN PATENT DOCUMENTS

| | | | |
|---|---|---|---|
| JP | 2013076471 A | 4/2013 | |
| JP | 2013088036 | 5/2013 | |
| JP | 2015081676 A * | 4/2015 | ............ E04B 1/803 |
| JP | 2015092105 A | 5/2015 | |
| JP | 2015092106 A | 5/2015 | |
| KR | 20020057547 | 7/2002 | |
| KR | 20020080938 | 10/2002 | |
| KR | 20030083812 | 11/2003 | |
| KR | 20040000126 | 1/2004 | |
| KR | 20050095357 A | 9/2005 | |
| KR | 100620025 B1 | 9/2006 | |
| KR | 1020070044024 | 4/2007 | |
| KR | 1020050126499 A | 6/2007 | |
| KR | 1020080103845 | 11/2008 | |
| KR | 20090026045 | 3/2009 | |
| KR | 1017776 | 2/2011 | |
| KR | 20120007241 | 1/2012 | |
| KR | 2012046621 | 5/2012 | |
| KR | 2012051305 | 5/2012 | |
| KR | 20150089495 A | 8/2015 | |
| RU | 547614 | 5/1977 | |
| RU | 2061925 C1 | 6/1996 | |
| RU | 2077411 C1 | 4/1997 | |
| RU | 2081858 | 6/1997 | |
| RU | 2132522 C1 | 6/1999 | |
| RU | 2162576 C2 | 1/2001 | |
| RU | 2166158 C1 | 4/2001 | |
| RU | 2187433 C2 | 8/2002 | |
| RU | 2234645 C1 | 8/2004 | |
| RU | 2252377 | 5/2005 | |
| RU | 2253792 C2 | 6/2005 | |
| RU | 2349618 C2 | 3/2009 | |
| RU | 2414288 C2 | 3/2011 | |
| RU | 2422598 | 6/2011 | |
| RU | 142892 | 7/2014 | |
| RU | 2529525 C1 | 9/2014 | |
| RU | 2571031 | 12/2015 | |
| SU | 203707 | 12/1967 | |
| SU | 00476407 A1 | 7/1975 | |
| SU | 648780 A1 | 2/1979 | |
| SU | 0130786 A1 | 4/1987 | |
| WO | 9721767 | 6/1997 | |
| WO | 9614207 A1 | 5/1998 | |
| WO | 1998049506 A1 | 11/1998 | |
| WO | 02060576 A1 | 4/1999 | |
| WO | 9614207 A1 | 4/1999 | |
| WO | 9920961 A1 | 4/1999 | |
| WO | 9920964 A1 | 4/1999 | |
| WO | 199920964 | 4/1999 | |
| WO | 200160598 | 8/2001 | |
| WO | 200202987 | 1/2002 | |
| WO | 2002052208 | 4/2002 | |
| WO | 02060576 A1 | 8/2002 | |
| WO | 03072684 A1 | 9/2003 | |
| WO | 03089729 | 10/2003 | |
| WO | 2004010042 A1 | 1/2004 | |
| WO | 2006045694 | 5/2006 | |
| WO | 2006073540 A2 | 7/2006 | |
| WO | 2007033836 A1 | 3/2007 | |
| WO | 2007085511 | 8/2007 | |
| WO | 2007106067 A2 | 9/2007 | |
| WO | 2008065453 | 6/2008 | |
| WO | 2008077741 | 7/2008 | |
| WO | 2008118536 A2 | 10/2008 | |
| WO | 2008122483 A2 | 10/2008 | |
| WO | 2009013106 A2 | 1/2009 | |
| WO | 2009112433 A1 | 9/2009 | |
| WO | 2009147106 | 12/2009 | |
| WO | 2010007783 A1 | 1/2010 | |
| WO | 2010029730 | 3/2010 | |
| WO | 2010043009 | 4/2010 | |
| WO | 2010092627 | 8/2010 | |
| WO | 2010127947 | 11/2010 | |
| WO | 2010127947 A2 | 11/2010 | |
| WO | 2011003711 | 1/2011 | |
| WO | 2011058678 | 5/2011 | |
| WO | 2011058678 A1 | 5/2011 | |
| WO | 2011081498 | 7/2011 | |
| WO | 2010007783 A1 | 1/2012 | |
| WO | 2012023705 | 2/2012 | |
| WO | 2012026715 | 3/2012 | |
| WO | 2012031885 | 3/2012 | |
| WO | 2012043990 A3 | 6/2012 | |
| WO | 2012044001 A3 | 6/2012 | |
| WO | 2012119892 | 9/2012 | |
| WO | 2012152646 | 11/2012 | |
| WO | 2012085212 A9 | 7/2013 | |
| WO | 2013116103 | 8/2013 | |
| WO | 2013116302 | 8/2013 | |
| WO | 2014038150 A1 | 3/2014 | |
| WO | 2014095542 | 6/2014 | |
| WO | 2014121893 A1 | 8/2014 | |
| WO | 2014184393 | 11/2014 | |
| WO | 2014184393 A1 | 11/2014 | |
| WO | 2013140816 A1 | 8/2015 | |
| WO | 2016082907 A1 | 6/2016 | |
| WO | 2017029782 A1 | 2/2017 | |

OTHER PUBLICATIONS

KitchenAid, "Refrigerator user instructions," Sep. 5, 2015, 120 pages.
European Patent Application No. 14158619, Search Report, dated Jun. 22, 2015, 9 pages.
European Patent Application No. 15153481, Search Report, dated Jul. 10, 2015, 6 pages.
European Patent Application No. 15154577.9, Search Report, dated Jul. 20, 2015, 8 pages.
European Patent Application No. 13775196.2, Supplemental Search Report, dated Dec. 7, 2015, 10 pages.
International Search Report, Application No. PCT/US2016/020896, dated May 12, 2016. 3 pages.
International Searching Authority, "Search Report," issued in connection with International Patent Application No. PCT/US2016/062479, dated Feb. 9, 2017, 8 pages.
International Searching Authority, "Search Report," issued in connection with International Patent Application No. PCT/US2016/060947, dated Feb. 2, 2017, 8 pages.
International Searching Authority, "Search Report," issued in connection with International Patent Application No. PCT/US2016/061125, dated Jan. 12, 2017, 9 pages.
International Searching Authority, "Search Report," issued in connection with International Patent Application No. PCT/US2016/062453, dated Feb. 9, 2017, 8 pages.
International Searching Authority, "Search Report," issued in connection with International Patent Application No. PCT/US2016/061790, dated Jan. 26, 2017, 8 pages.
International Searching Authority, "Search Report," issued in connection with International Patent Application No. PCT/US2016/062029, dated Jan. 26, 2017, 8 pages.
International Searching Authority, "Search Report," issued in connection with International patent Application No. PCT/US2016/060961, dated Feb. 2, 2017, 9 pages.
International Search Report, Application No. PCT/US2016/054067, dated Jun. 29, 2017, 7 pages.
International Search Report, Application No. PCT/US2016/054121, dated Jul. 6, 2017, 9 pages.
International Search Report, Application No. PCT/US2016055161, dated Jun. 29, 2017, 9 pages.
International Search Report, Application No. PCT/US2016/055304, dated Jun. 29, 2017, 9 pages.
Cai et al., "Generation of Metal Nanoparticles by Laser Ablation of Microspheres," J. Aerosol Sci., vol. 29, No. 5/6 (1998), pp. 627-636.
Raszewski et al., "Methods for Producing Hollow Glass Microspheres," Powerpoint, cached from Google, Jul. 2009, 6 pages.
International Search Report, International Application No. PCT/US2016/060519, dated Mar. 16, 2017, 10 pages.
International Search Report, International Application No. PCT/US2016/062804, dated Feb. 27, 2017, 9 pages.

(56) References Cited

OTHER PUBLICATIONS

International Search Report, International Application No. PCT/US2016/063023, dated Mar. 30, 2017, 7 pages.
International Search Report, International Application No. PCT/US2016/063065, dated Apr. 20, 2017, 9 pages.
International Search Report, International Application No. PCT/US2016/063355, dated Feb. 27, 2017, 9 pages.
International Search Report, International Application No. PCT/US2016/063958, dated Mar. 6, 2017, 10 pages.
International Patent Application No. PCT/US2013036203, International Search Report, dated Jul. 26, 2013, 10 pages.
European Patent Application No. 14158608.1, Search Report, dated Sep. 30, 2014, 5 pages.
International Search Report, PCT/US2016/043991, dated Apr. 27, 2017, 8 pages.
International Search Report, PCT/US2016/047558, dated Jun. 8, 2017, 9 pages.
International Search Report, PCT/US2016/062189, dated Mar. 30, 2017, 7 pages.
International Search Report, PCT/US2016/053711, dated Aug. 31, 2017, 8 pages.
International Search Report, PCT/US2016/054639, dated Aug. 17, 2017, 8 pages.
International Search Report, PCT/US2016/057271, dated Aug. 17, 2017, 8 pages.
International Search Report, PCT/US2017/017802, dated Sep. 28, 2017, 9 pages.
International Search Report, PCT/US2017/019930, dated Sep. 28, 2017, 9 pages.
BASF, "Balindur™ Solutions for fixing Vaccum Insulated Panels," web page, 4 pages, date unknown, http://performance-materials.basf.us/products/view/family/balindur, at least as early as Dec. 21, 2015.
BASF, "Balindur™," web page, 2 pages, date unknown, http://product-finder.basf.com/group/corporate/product-finder/en/brand/BALINDUR, at least as early as Dec. 21, 2015.
PU Solutions Elastogram, "Balindur™ masters the challenge," web page, 2 pages, date unknown, http://product-finder.basf.com/group/corporate/product-finderien/literature-document:/Brand+Balindur-Flyer--Balindur+The+new+VIP+fixation+technology-English.pdf, Dec. 21, 2014.

\* cited by examiner

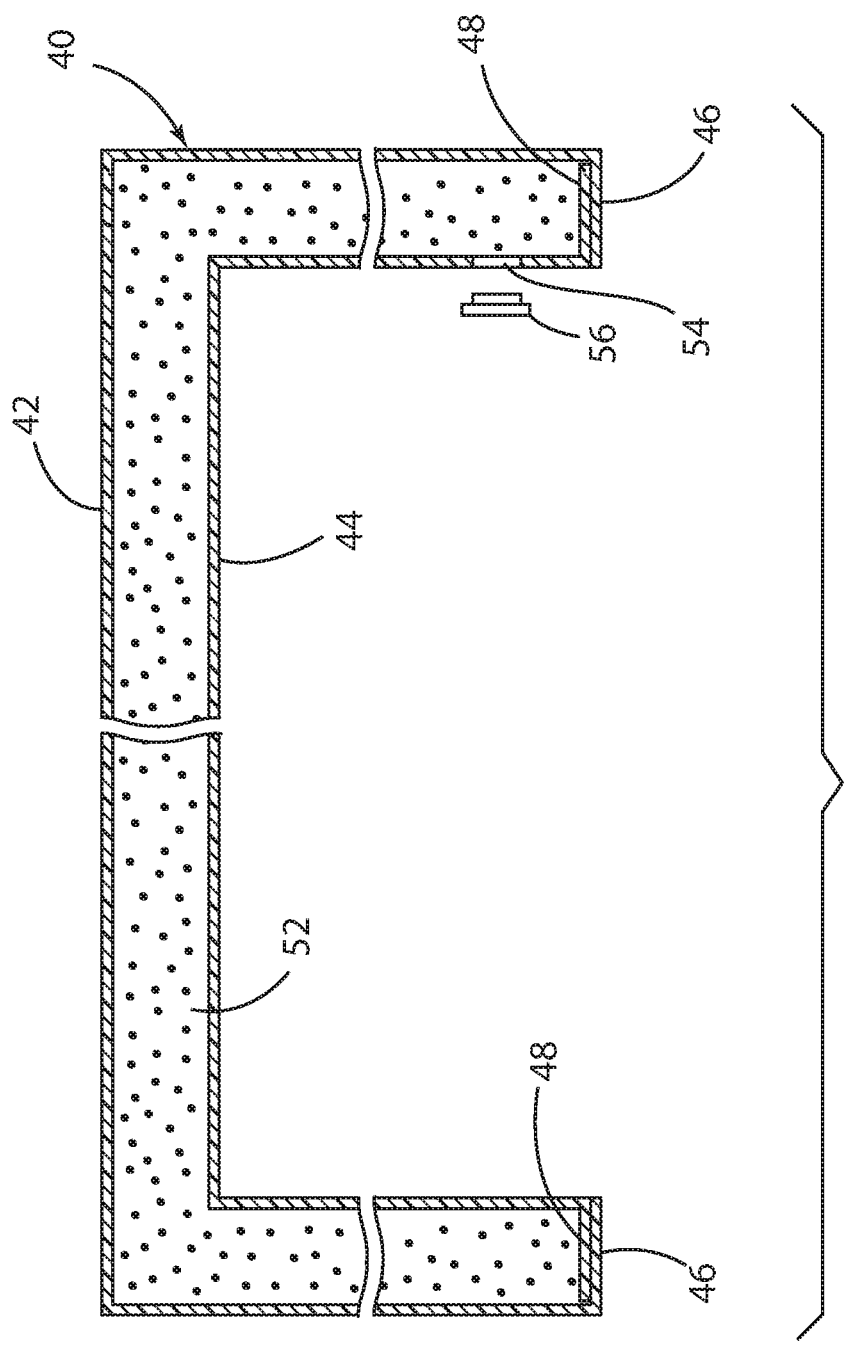

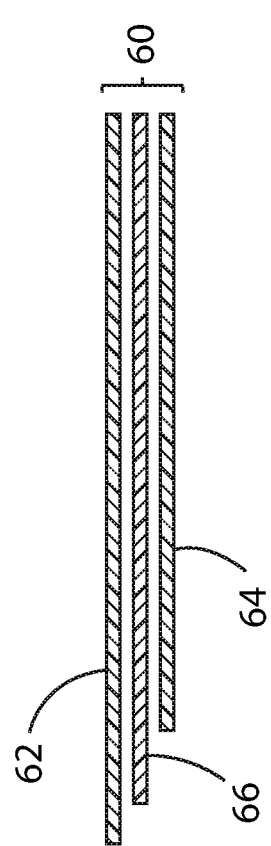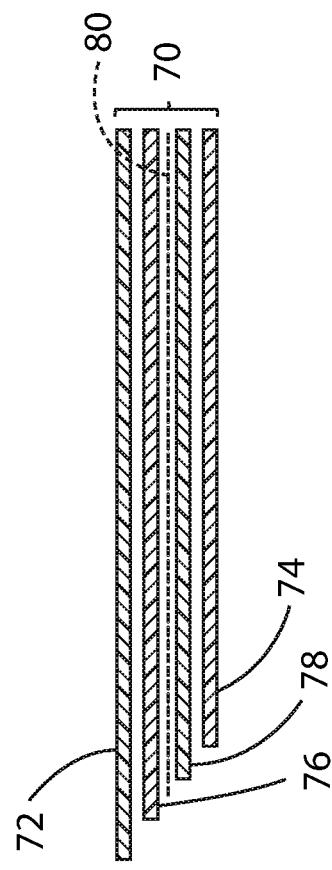

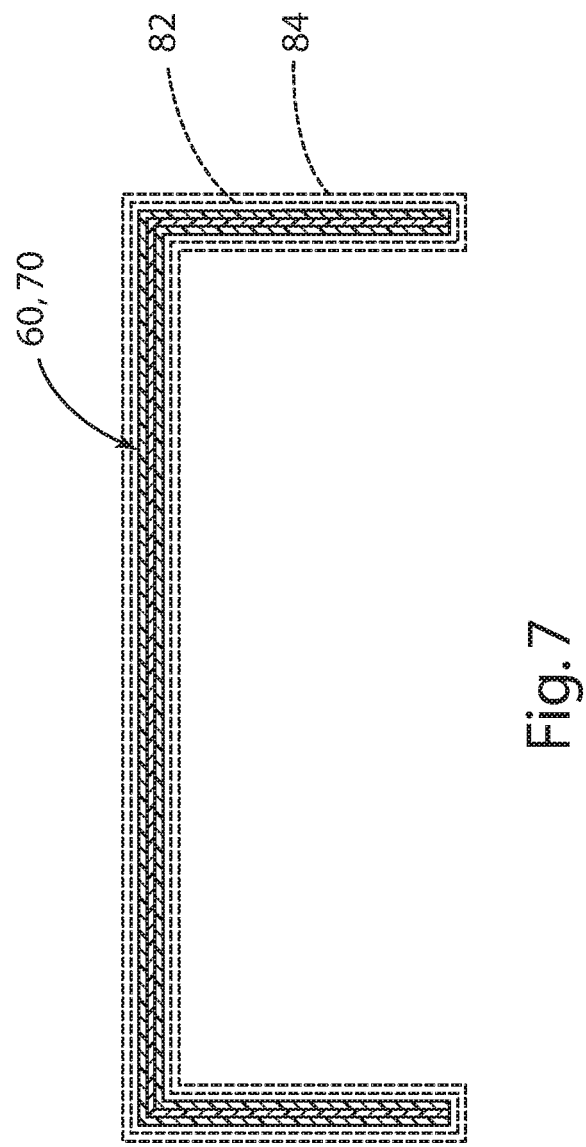

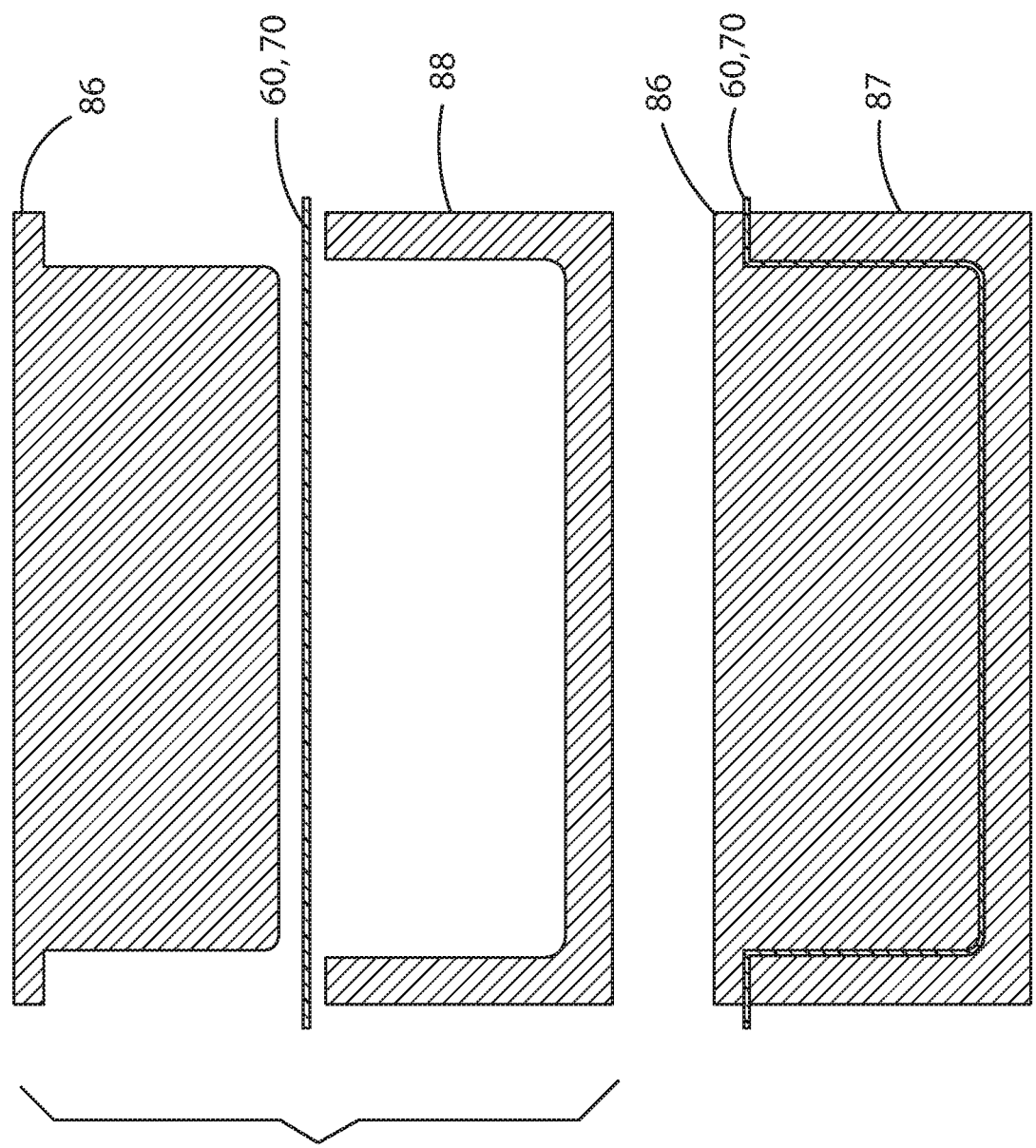

MULTILAYER BARRIER MATERIALS WITH PVD OR PLASMA COATING FOR VACUUM INSULATED STRUCTURE

CROSS-REFERENCE TO RELATED APPLICATION

This application is related to U.S. patent application Ser. No. 14/980,778 filed on Dec. 28, 2015, entitled "MULTI-LAYER GAS BARRIER MATERIALS FOR VACUUM INSULATED STRUCTURE," now U.S. Pat. No. 10,018, 406, issued on Jul. 10, 2018, the disclosure of which is hereby incorporated herein by reference in its entirety.

BACKGROUND OF THE INVENTION

Various types of vacuum panels and other vacuum insulated structures have been developed for use in refrigerator cabinets, doors, cooking cavity, dryer systems, water heaters, freezers, insulation box and pipes systems, and other such components. Vacuum insulated structures may have superior insulation properties relative to conventional polyurethane foam insulation. However, known vacuum insulated structures and processes for fabricating such structures may suffer from various drawbacks.

SUMMARY OF THE INVENTION

A method of forming a vacuum insulated cabinet structure includes providing a multi-layer sheet of material comprising at least one layer of barrier material that is disposed between first and second outer layers. The barrier material and the first and second outer layers comprise thermoplastic polymers or other elastomeric or hybrid material systems. The multi-layer sheet of material is thermoformed to form a non-planar first component. The multi-layer sheet may optionally comprise a central portion and four sidewalls extending transversely from the central portion. After the multi-layer sheet of material is thermoformed or vacuum formed, at least one of the first and second outer layers is at least partially coated with a barrier material utilizing a plasma polymerization process or a physical vapor deposition process. The method further includes securing a second component to the first component to form an interior space therebetween. The second component may optionally comprise a central portion and four sidewalls extending transversely from the central portion. Porous filler material is positioned in the interior space, and a vacuum is formed in the interior space by removing the gaseous components and moisture. The first and second components are sealed together to form a vacuum insulated refrigerator cabinet structure.

These and other features, advantages, and objects of the present disclosure will be further understood and appreciated by those skilled in the art by reference to the following specification, claims, and appended drawings.

BRIEF DESCRIPTION OF THE DRAWINGS

FIG. 4 is partially schematic cross sectional view of a multilayer material that may be utilized to form wrappers, liners, and other such components of refrigerator cabinets, doors, and the like;

FIG. 5 is a partially schematic exploded cross sectional view of a three-layer sheet of material;

FIG. 6 is a partially schematic exploded cross sectional view of a four-layer sheet of material;

FIG. 7 is a partially schematic cross sectional view of a multi-layer barrier structure that has been at least partially coated with a barrier material;

FIG. 8 is a schematic view of a thermoforming tool/process; and

FIG. 9 is a schematic view of a thermoforming tool/process.

DETAILED DESCRIPTION

Figure 1:
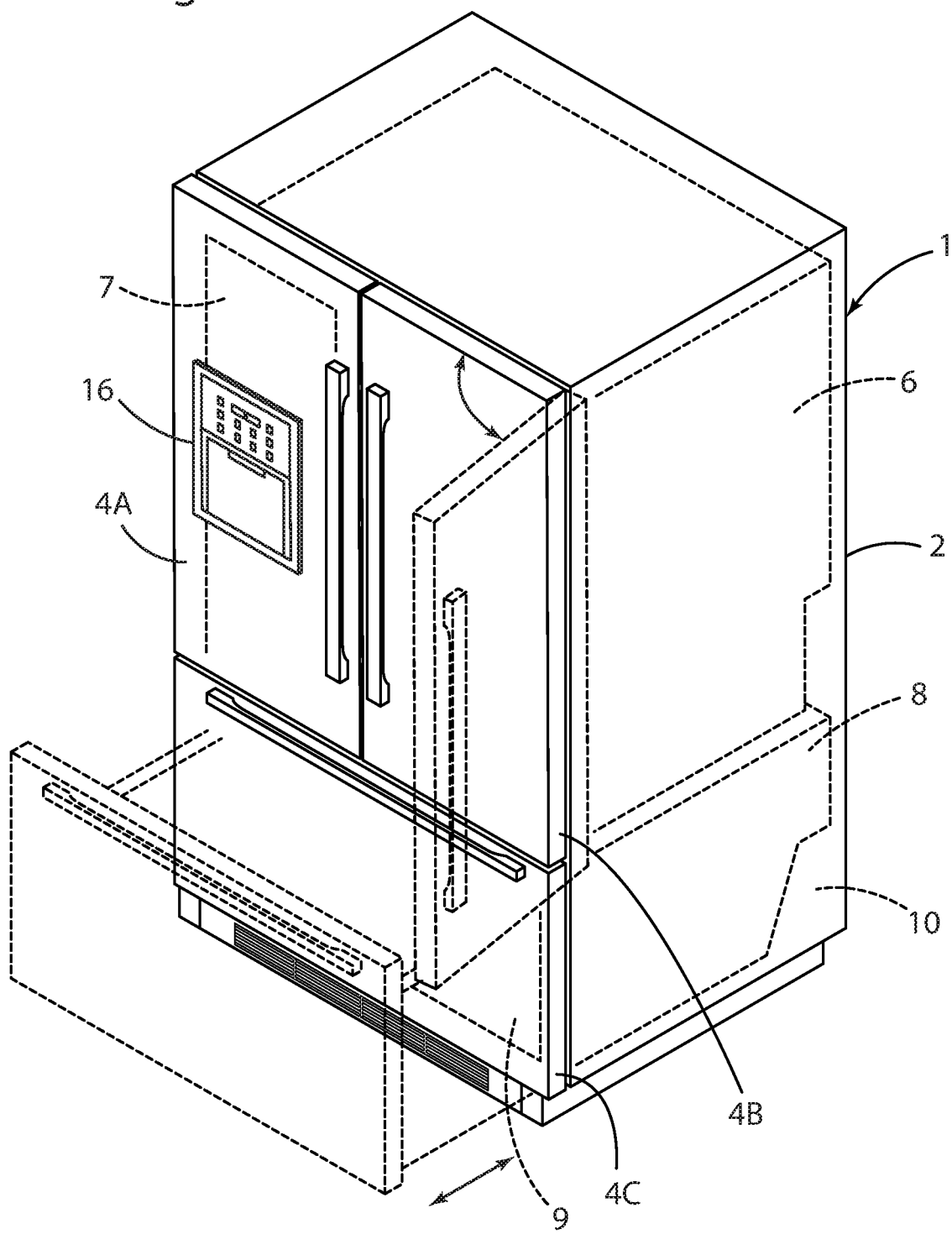
FIG. 1 is an isometric view of a refrigerator.

For purposes of description herein, the terms "upper," "lower," "right," "left," "rear," "front," "vertical," "horizontal," and derivatives thereof shall relate to the device as oriented in FIG. 1. However, it is to be understood that the disclosed subject matter may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes an insulated cabinet 2 having an upper fresh food compartment 6 that can be accessed through access opening 7 by opening doors 4A and 4B. The insulated refrigerator cabinet 2 also includes an insulated freezer compartment 8 that can be accessed through access opening 9 by opening a lower door/drawer 4C. Refrigerator 1 may include a cooling system (not shown) disposed in a machine compartment 10. The cooling system may include a compressor, condenser, evaporator, and other related components that are generally known in the art. Alternatively, the cooling system may comprise one or more thermoelectric elements. Door 4A may include an ice/water dispenser 16.

Figures 2, 3:
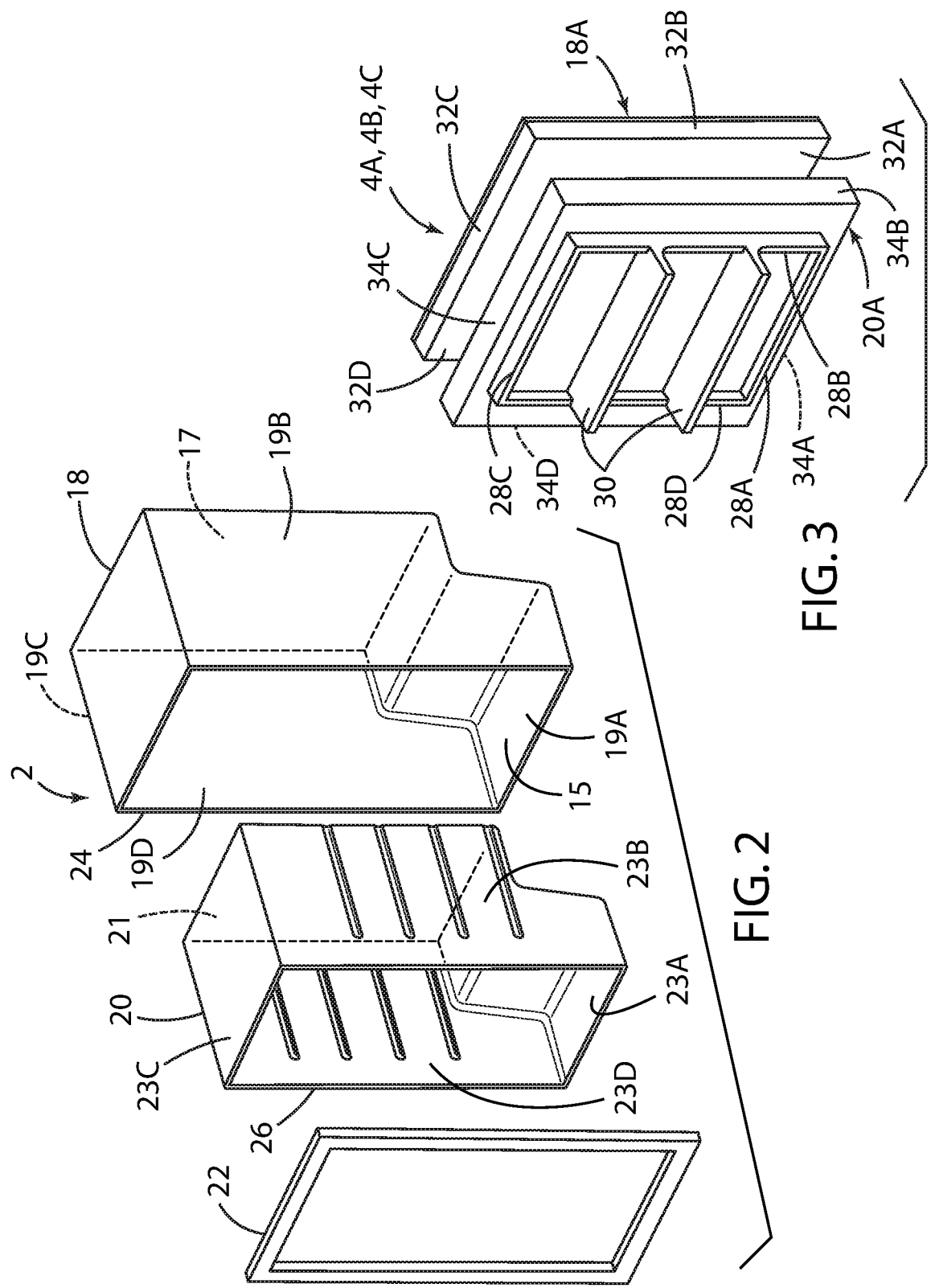
FIG. 2 is an exploded isometric view of a vacuum insulated cabinet structure for a refrigerator.
FIG. 3 is an exploded isometric view of a vacuum insulated door structure for a refrigerator.

With further reference to FIG. 2, refrigerator cabinet 2 may comprise a wrapper 18 and a liner 20 that fits inside the wrapper 18 when assembled. An optional trim piece 22 may be utilized to interconnect and seal off front edges 24 and 26 of wrapper 18 and liner 20, respectively, when cabinet 2 is assembled. As discussed in more detail below, wrapper 18, liner 20, and/or trim piece 22 may be formed from a multilayer thermoplastic polymer material including one or more barrier layers that are substantially impervious to nitrogen, oxygen, water vapor, carbon dioxide, and other such gasses whereby a vacuum can be maintained in an internal space between wrapper 18 and liner 20. The trim piece may optionally comprise a thermoset material with or without fillers or reinforcements (i.e. fibers) and may optionally include a barrier coating. As discussed below, wrapper 18 and/or liner 20 may be fabricated by thermoforming a multi-layer sheet of thermoplastic polymer material, followed by high barrier coating at least a portion of the thermoformed material utilizing a Physical Vapor Deposition (PVD) process or a plasma polymerization coating process.

One or more of the components 18, 20 and 22 may optionally be made from metal or other suitable material. For example, wrapper 18 may be made from sheet metal, and liner 20 may be made from a multi-layer thermoformed polymer material having barrier properties. Wrapper 18 may include a generally planar central sidewall portion 17, and four sidewalls 19A-19D that extend transversely from the central sidewall portion 17 to define an interior space 15 that receives liner 20 when assembled. Liner 20 may include a generally planar rectangular central sidewall 21 that is spaced from central sidewall 17 of wrapper 18 when assembled. The liner 20 also includes sidewalls 23A-23D that extend transversely from the central sidewall 21. When assembled, the sidewalls 23A-23D are spaced inwardly from the sidewalls 19A-19D, respectively, of wrapper 18 to form a gap or space therebetween that may be filled with a porous filler material and evacuated to form a vacuum.

With further reference to FIG. 3, a refrigerator door 4A-4C may include an outer panel member 18A, and an inner liner 20A. The outer panel member 18A and liner 20A may be formed from a multilayer thermoformed polymer material having barrier properties as discussed below to thereby permit forming a vacuum between outer member 18A and liner 20A when assembled. The outer door member 18A may, alternatively, be formed from sheet metal or other material. Outer member 18A may include flanges 32A-32D that fit over and overlap corresponding flanges 34A-34B of liner 20A when assembled. The liner 20A may optionally include one or more raised ribs 28A-28C and shelves 30 as may be required for a particular application.

With reference to FIG. 4, a vacuum insulated refrigerator structure 40 includes a multi-layer polymer wrapper 42 and a multi-layer polymer liner 44. Wrapper 42 and/or liner 44 may comprise thermoformed tri-layer polymer material 60 (FIG. 5) or thermoformed quad-layer polymer material 70 (FIG. 6). Vacuum insulated structure 40 may comprise a vacuum insulated cabinet structure 2, a vacuum insulated door 4A-4C, or other vacuum insulated refrigerator structure. Polymer wrapper 42 may include flanges 46 that overlap flanges 48 of polymer liner 44. The flanges 46 and 48 may be interconnected to form an airtight seal. Alternatively, the polymer wrapper 42 and polymer liner 44 may be interconnected utilizing other suitable connecting structures and techniques such as welding, adhesive joining or compressed gasket fitting. The polymer wrapper 42 and polymer liner 44 form an interior space 50 that may be filled nano or micro porous super insulation material such as fumed silica, precipitated silica, hollow glass microsphere, perlite, rice husk ash, ceno sphere or fly ash 52, and the interior space 50 may be evacuated and sealed whereby the interior space 50 defines a vacuum. During fabrication, the polymer wrapper 42 and polymer liner 44 may be assembled together and sealingly interconnected. The wrapper and liner 42 and 44 may then be placed in a vacuum chamber, and silica powder 52 may be introduced into the interior space 50 through one or more openings 54. The openings 54 may then be sealed with a cap 56, and the vacuum insulated refrigerator structure 40 may then be removed from the vacuum chamber.

As discussed in more detail below in connection with FIG. 7, the multi-layer polymer wrapper and/or the multi-layer polymer liner 44 may be coated after thermoforming utilizing plasma polymerization or Physical Vapor Deposition (PVD) processes or other suitable spray process. These coating processes further enhance the barrier properties by blocking oxygen, nitrogen, water vapor, and other gasses.

With further reference to FIG. 5, the wrapper 42 and/or liner 44 may be thermoformed from a tri-layer sheet 60 of polymer material. The sheet 60 comprises first and second outer structure layers 62 and 64 and a barrier layer 66 that is disposed between the first and second outer layers 62 and 64, respectively. The layers 62, 64, and 66 comprise thermoplastic polymers. Layer 66 may optionally comprise an elastomeric material. Layers 62, 64, and 66 are shown in a spaced apart exploded view in FIG. 5. However, it will be understood that the layers 62, 64, and 66 are coextruded or laminated together to form a single multi-layer sheet prior to thermoforming. The first and second outer structural layers 62 and 64, respectively, may comprise a suitable thermoplastic polymer material such as High Impact Polystyrene (HIPS) or Acrylonitrile, Butadiene and Styrene (ABS), Polypropylene or Poly Butylene Teraphthalate or Polyethylene. The barrier layer 66 may comprise a thermoplastic polymer material that is impervious to one or more gasses such as nitrogen, oxygen, water vapor, carbon dioxide, etc. such that the wrapper and liner 42 and 44 (FIG. 4) provide a barrier to permit forming a vacuum in interior space 50. The barrier layer 66 preferably comprises a material that blocks both oxygen and water vapor simultaneously. Examples of such material include Polyvinylidene Chloride (PVdC), high barrier nylon, or liquid crystal polymer. The layers 62, 64, and 66 may be co-extruded or laminated together. The thickness of the barrier layer 66 may be adjusted as required for different applications to meet varied requirements with respect to oxygen and water vapor transmission rates. The materials of layers 62, 64, and 66 are selected to have very good thermoforming properties to permit deep draw ratio thermoforming of components such as wrapper 18 and liner 20 (FIG. 2) and the door components 18A and 20A (FIG. 3), and other vacuum insulated refrigerator structures. Typically, the first outer layer 62 and the second outer layer 64 have a thickness of about 0.1 mm to 10 mm, and the barrier layer(s) have a thickness of about 0.1 mm to 10 mm.

The following are examples of material combinations that may be utilized to form tri-layer sheet 60:
Example 1: HIPS/PVdC/HIPS
Example 2: HIPS/Nylon/HIPS
Example 3: HIPS/MXD-6 Nylon/HIPS
Example 4: HIPS/MXD-6 Nylon with clay filler/HIPS
Example 5: HIPS/Liquid Crystal Polymer/HIPS With further reference to FIG. 6, a quad-layer sheet 70 having first and second outer layers 72 and 74, respectively, and two barrier layers 76 and 78 may also be utilized to form wrapper 18, liner 20 (FIG. 2) and outer member 18A and inner member 20A (FIG. 3) to form vacuum insulated refrigerator cabinet structures, vacuum insulated doors, or other such components. The outer layers 72 and 74 may comprise HIPS, ABS, or other suitable polymer material (Polypropylene or Poly Butylene Teraphthalate or Polyethylene that is capable of being thermoformed. The first barrier layer 76 may comprise a thermoplastic polymer material that is substantially impervious to water vapor. Examples of thermoplastic polymer or elastomeric materials for first barrier layer 76 include fluoropolymer such as Tetrafluoroethylene (THV), polychlorotrifluoroethylene (PCTFE), Cyclic Olefin Copolymer (COC), Cyclic Olefin Polymer (COP) or high density polyethylene (HDPE). The second barrier layer 78 may comprise a thermoplastic polymer that is substantially impervious to oxygen. Examples of thermoplastic polymer materials include ethylene vinyl alcohol EVOH. An optional tying layer 80 comprising a thermoplastic polymer material may be disposed between the barrier layers 76 and 78. Tie layer 80 may be utilized to bond barrier layers 76 and 78 to one another. Examples of suitable materials for the tie layer include adhesive resins, such as modified polyolefin with functional groups that are capable of bonding to a variety of polymers and metals.

The following are examples of material combinations that may be utilized to form quad-layer sheet 70:

Example 1: HIPS/EVOH/HDPE/HIPS
Example 2: HIPS/EVOH/COP/HIPS
Example 3: HIPS/EVOH/COC/HIPS
Example 4: HIPS/EVOH/THV/HIPS THV
Example 5: HIPS/EVOH/PCTFE/HIPS Layers 72, 74, 76, 78 and 80 are coextruded or laminated together to form a single sheet of material prior to thermoforming.

It will be understood that wrappers, liners, and other such components as disclosed herein are not limited to the tri-layer sheet 60 or the quad-layer sheet 70 configurations described above, and additional layers of material may also be utilized.

With further reference to FIG. 7, after the multi-layer sheet 60 or 70 is thermoformed, the sheet 60 or 70 may be at least partially coated with a layer of material 82. Layer 82 may comprise an organic or inorganic material such as silicon oxide that is deposited utilizing a plasma polymerization process. Alternatively, layer 82 may comprise a metallic layer such as aluminum, stainless steel, chrome, nickel or other suitable metal that is applied utilizing a Physical Vapor Deposition (PVD) process. Accordingly, layer 82 preferably comprises a barrier material that provides additional barrier performance and blocks gasses to maintain the vacuum formed in interior space 50 (FIG. 4). An additional outer layer in the form of a protective cap 84 may be applied over the coating 82. The protective cap layer may comprise a organic or inorganic material having a thickness of about 10 to 150 microns. The protective cap 84 may be applied by spray, PVD or a plasma process. The protective cap 84 improves the robustness/wear characteristics of the surface of a liner, wrapper, or other component. The layer 82 and cap 84 may be applied to a wrapper or liner after thermoforming, preferably (optionally) prior to interconnecting the wrapper and liner (e.g. wrapper 42 and liner 44; FIG. 4). Alternatively, the layer 82 and protective cap 84 may be applied after the wrapper and liner are assembled and sealed together. However, the coating layer 82 and the cap 84 are preferably applied prior to assembly of the wrapper and liner to thereby permit both the inner and outer sides of the wrapper and liner to be coated with layer 82 and cap 84.

With further reference to FIGS. 8 and 9, multi-layer sheets 60 and 70 may be thermoformed utilizing male and female mold parts 86 and 88, respectively. Sheet 60 or 70 is initially positioned between mold parts 86 and 88 as shown in FIG. 8, and the sheet 60 or 70 is heated to temperature at which the sheet 60 or 70 can be plastically deformed by pressing the mold parts together as shown in FIG. 9 to form a wrapper, liner, or other such component. As used herein, the term "thermoforming" and variations thereof broadly means a forming process in which a sheet of thermoplastic polymer material is heated and formed, and "thermoforming" is not limited to the specific process/tools shown in FIGS. 8 and 9. For example, components may be thermoformed utilizing a vacuum forming process whereby a vacuum is utilized to deform sheet 60 or 70 to fit closely in female mold 87 such that a male mold part 86 is not required.

It is to be understood that variations and modifications can be made on the aforementioned structure without departing from the concepts of the present disclosure, and further it is to be understood that such concepts are intended to be covered by the following claims unless these claims by their language expressly state otherwise.

The invention claimed is:

1. A method of forming a vacuum insulated appliance structure, the method comprising:

providing a multi-layer sheet of material comprising at least one layer of inner barrier material disposed between first and second outer layers, wherein the inner barrier material and the first and second outer layers comprise thermoplastic polymers having thermoforming properties that permit deep draw ratio thermoforming;

heating and plastically forming the sheet of material to form a first component, at least a portion of which is non-planar;

followed by at least partially coating at least one of the first and second outer layers with an outer barrier material utilizing a plasma polymerization process or a physical vapor deposition process;

securing a second component to the first component to form an interior space therebetween;

positioning porous filler material in the interior space;

forming a vacuum in the interior space; and sealing the first and second components together around the porous filler material to form a vacuum insulated appliance structure.

2. The method of claim 1, wherein:
the outer barrier material comprises an inorganic material.

3. The method of claim 2, wherein:
the outer barrier material comprises metal.

4. The method of claim 1, including:
applying a protective cap over the outer barrier material.

5. The method of claim 4, wherein:
the protective cap is about 10-150 microns thick.

6. The method of claim 4, wherein:
the protective cap is formed by spray, PVD or plasma process.

7. The method of claim 1, wherein:
the first component comprises a central portion and four sidewalls extending transversely from the central portion;
the second component comprises a central portion and four sidewalls extending transversely from the central portion.

8. The method of claim 1, wherein:
the first component comprises a door liner;
the second component comprises a door wrapper.

9. The method of claim 1, wherein:
the outer layers comprise at least one of HIPS or ABS, PP, PBT or PE.

10. The method of claim 9, wherein:
the inner barrier material comprises at least one of PVDC, nylon, or liquid crystal polymer.

11. The method of claim 10, wherein:
the at least one layer of inner barrier material comprises first and second inner barrier layers.

12. The method of claim 11, wherein:
the first inner barrier layer comprises at least one of a fluoropolymer, COC, COP, or HDPE.

13. The method of claim 12, wherein:
the second inner barrier layer comprises EVOH.

14. The method of claim 11, including:
a tie layer disposed between the first and second inner barrier layers, wherein the tie layer comprises a tying polymer material that bonds to the first and second inner barrier materials.

15. The method of claim 14, wherein:
the tying polymer material comprises modified polyolefin with functional groups whereby the tying polymer is capable of bonding to polymers and metals.

16. The method of claim 7, wherein:
the first component comprises a liner of a refrigerator cabinet;
the second component comprises a sheet metal wrapper of a refrigerator cabinet.

17. The method of claim 1, wherein:
heating and forming the sheet of material comprises a thermoforming process.

18. The method of claim 1, wherein:
comprising first and second inner barrier materials, respectively, wherein the first inner barrier material is impervious to oxygen.

19. A method of forming a vacuum insulated appliance structure, the method comprising:
providing a multi-layer sheet of material comprising at least one layer of inner barrier material disposed between first and second outer layers, wherein the inner barrier material and the first and second outer layers comprise thermoplastic polymers;
heating and forming the sheet of material to form a first component, at least a portion of which is non-planar;
followed by at least partially coating at least one of the first and second outer layers with a metal outer barrier material utilizing a plasma polymerization process or a physical vapor deposition process;
securing a second component to the first component to form an interior space therebetween;
positioning porous filler material in the interior space;
forming a vacuum in the interior space; and
sealing the first and second components together around the porous filler material to form a vacuum insulated appliance structure.

\* \* \* \* \*